United States Patent
Yamamoto

(10) Patent No.: US 9,561,754 B2
(45) Date of Patent: Feb. 7, 2017

(54) UTILITY VEHICLE

(71) Applicant: KAWASAKI JUKOGYO KABUSHIKI KAISHA, Hyogo (JP)

(72) Inventor: Teruaki Yamamoto, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 23 days.

(21) Appl. No.: 14/665,557

(22) Filed: Mar. 23, 2015

(65) Prior Publication Data
US 2016/0280142 A1 Sep. 29, 2016

(51) Int. Cl.
B60R 7/04 (2006.01)

(52) U.S. Cl.
CPC .................... B60R 7/043 (2013.01)

(58) Field of Classification Search
CPC .................. B60R 7/04; B60R 7/043
USPC ............................ 296/37.8, 37.15
See application file for complete search history.

(56) References Cited

U.S. PATENT DOCUMENTS

| | | | | |
|---|---|---|---|---|
| 6,074,000 A * | 6/2000 | Wagner | ................... | B60R 7/043 297/188.08 |
| 6,264,260 B1 * | 7/2001 | Kronner | ................... | B60R 7/043 296/37.15 |
| 7,240,943 B2 * | 7/2007 | Williamson | ............ | B60R 7/043 224/275 |
| 7,341,301 B1 * | 3/2008 | Schambre | ............... | B60R 7/043 224/275 |
| 7,628,438 B2 * | 12/2009 | Partch | .................... | B60N 2/305 296/24.46 |
| 8,499,870 B2 * | 8/2013 | Nakamura | ........... | B62D 21/186 180/68.3 |
| 8,960,754 B1 * | 2/2015 | Maeda | ..................... | B60R 11/06 224/275 |
| 9,016,749 B2 * | 4/2015 | Mueller | .................. | B60R 5/006 296/37.14 |
| 9,126,538 B1 * | 9/2015 | Day | ....................... | B60R 7/043 |
| 2002/0005649 A1 * | 1/2002 | Hofmann | ............... | B60R 7/043 296/37.15 |
| 2004/0056500 A1 * | 3/2004 | Kayumi | .................... | B60N 2/01 296/37.15 |
| 2006/0006684 A1 * | 1/2006 | Maceri | .................... | B60R 7/043 296/37.15 |
| 2006/0244281 A1 * | 11/2006 | Cover | .................... | B60N 2/012 296/37.15 |
| 2008/0084082 A1 * | 4/2008 | Nakamura | .............. | B60R 11/00 296/37.15 |
| 2008/0093874 A1 * | 4/2008 | Partch | .................... | B60N 2/305 296/37.15 |
| 2009/0115229 A1 * | 5/2009 | Messner | .................. | A47C 7/62 297/188.1 |
| 2010/0007163 A1 * | 1/2010 | Almeida | ................ | B60N 2/062 296/37.8 |
| 2010/0158630 A1 * | 6/2010 | Combs, Jr. | ............. | B60R 7/005 410/118 |
| 2010/0231011 A1 * | 9/2010 | Lindsay | .................... | B60R 7/02 297/188.11 |
| 2012/0223500 A1 | 9/2012 | Kinsman et al. | | |

(Continued)

*Primary Examiner* — Gregory Blankenship
(74) *Attorney, Agent, or Firm* — Wenderoth, Lind & Ponack, L.L.P.

(57) ABSTRACT

In a utility vehicle, a storage space is formed by a first extension part of a front floor board and a second extension part of a rear floor board and by a sitting part of a seat.

5 Claims, 8 Drawing Sheets

(56) References Cited

U.S. PATENT DOCUMENTS

2013/0249233 A1* 9/2013 Yokouchi ............... B62K 19/46
                                                    296/37.15
2014/0225403 A1* 8/2014 Shimada ................ B60R 7/043
                                                    297/188.1

* cited by examiner

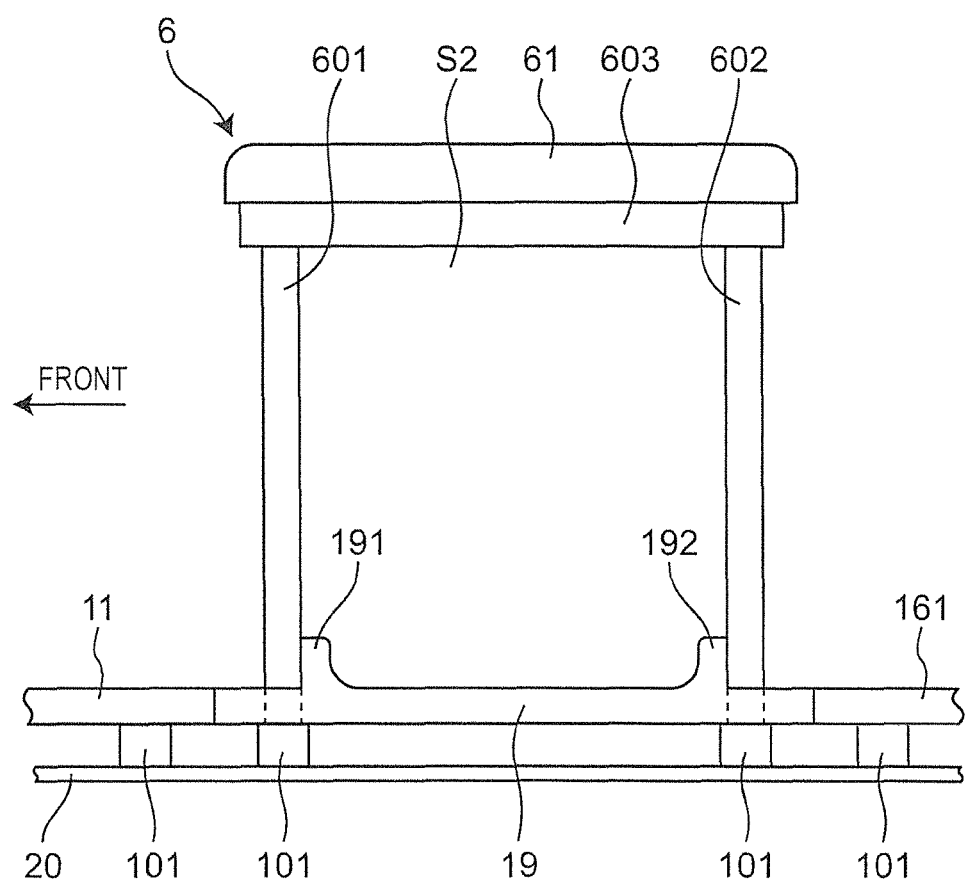

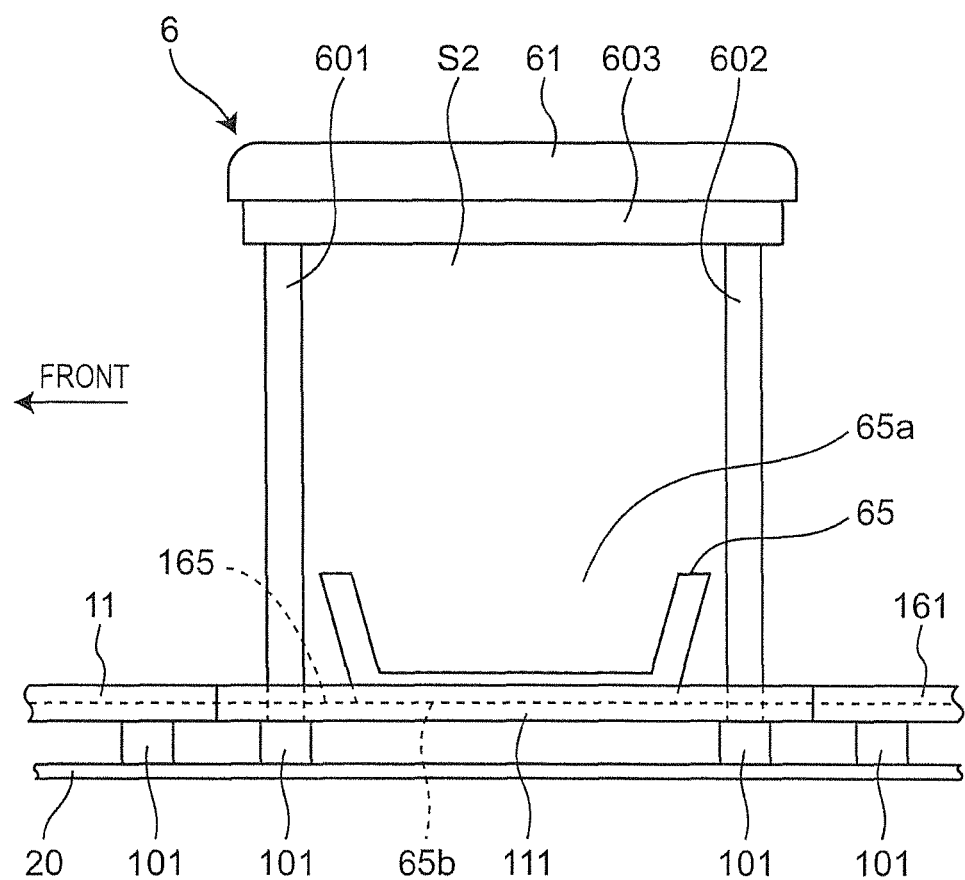

UTILITY VEHICLE

BACKGROUND OF THE INVENTION

1. Field of the Invention

The present invention relates to a utility vehicle and, in particular, to a utility vehicle including a storage space provided under a seat in order to contain baggage.

2. Description of the Related Art

In the conventional art, an example of a utility vehicle including a storage space provided under a seat is described in US Patent Application Publication No. 2012/0223500. In the utility vehicle, in order to avoid dust, water, or the like from the outside of the vehicle, a container having a substantially rectangular parallelepiped shape whose upper part is open is provided under the seat so that the inside of the container is used as the storage space. Then, the opening part of the container is covered by the sitting part of the seat in a manner of being capable of being opened and closed.

Nevertheless, in the above-mentioned utility vehicle of the conventional art, the container has been provided for each seat. This has caused a problem of high material cost or high fabrication cost in the forming of the container. Further, at the time of access to the storage space, the sitting part of the seat had to be opened and closed. This has caused a problem that the storage space cannot easily be accessed in a state of sitting on the seat.

SUMMARY OF THE INVENTION

The present invention has been devised in view of such problems. An object thereof is to provide a utility vehicle including a storage space which is provided under the seat and which can avoid dust, water, or the like from the outside of the vehicle, can be formed at a low cost, and can be accessed easily.

In order to achieve the object, the present invention provides a utility vehicle wherein a storage space for containing baggage is formed by an extension part of a floor board and a sitting part of a seat.

According to the present invention, the storage space is formed by the extension part of the floor board and the sitting part of the seat. Thus, the extension part of the floor board can prevent a situation that dust, water, or the like enters the storage space from the outside of the vehicle. Further, the storage space can be formed by a simpler configuration, for example, in comparison with a case that recesses are provided separately in the driver seat and in the passenger seat. Further, without the necessity of opening and closing the sitting part of the seat, that is, while sitting on the seat, the storage space can be accessed, for example, from the frontward and rearward directions. Thus, the storage space can be formed at a low cost and the inside of the storage space can easily be accessed.

In addition to the above-mentioned configuration, the present invention may preferably employ the following configurations.

(a) The storage space is a space surrounded by a seat frame of the seat.

According to the above-mentioned configuration (a), the storage space is surrounded by the seat frame of the seat and hence the baggage or the like stored in the storage space is located in the inside of the seat frame. This avoids a situation that the baggage or the like prevents the crew members from getting on and off or from moving.

(b) A front wall and/or a rear wall is provided in the storage space; when the front wall is provided, the front wall is attached to the extension part of the floor board in a manner of being rotatable frontward about a lower end part of the front wall; and when the rear wall is provided, the rear wall is attached to the extension part of the floor board in a manner of being rotatable rearward about a lower end part of the rear wall.

According to the above-mentioned configuration (b), the front wall and/or the rear wall is provided as well as the front wall can rotate frontward about the lower end part of the front wall and/or the rear wall can rotate rearward about the lower end part of the rear wall. Thus, the front wall and/or the rear wall can avoid a situation that the baggage or the like stored in the storage space jumps out in the frontward or rearward direction. Further, when the front wall and/or the rear wall has been rotated, the inside of the storage space can easily be accessed from frontward and/or rearward.

(c) A front wall and/or a rear wall is provided in the storage space; the front wall and/or the rear wall is constructed from a net member; and the net member is attached to the sitting part or the seat frame of the seat.

According to the above-mentioned configuration (c), the net member is attached to the sitting part or the seat frame of the seat. Thus, when a part of the net member is merely turned over, the inside of the storage space can easily be accessed.

(d) The extension part of the floor board includes a first protruding part and/or a second protruding part protruding upward with an interval in frontward and rearward directions.

According to the above-mentioned configuration (d), the extension part includes the first protruding part and/or second protruding part. Thus, the first protruding part and/or the second protruding part can be formed as the front wall and/or the rear wall in an integrated manner. Thus, in comparison with a case that the front wall and the rear wall are formed separate from the extension part, the fabrication cost of the front wall and the rear all can be reduced.

(e) A storage container for containing baggage is placed in the storage space; and the storage container is provided with an opening part opened upward and is provided in a manner of being movable in the frontward and rearward directions.

According to the above-mentioned configuration (e), the storage container is provided with the opening part and is provided in a manner of being movable in the frontward and rearward directions. Thus, the storage container can be moved in the frontward and rearward directions so as to be extracted from the storage space so that the opening part can be exposed. Accordingly, the inside of the storage container can easily be accessed through the opening part.

BRIEF DESCRIPTION OF THE DRAWINGS

FIG. 7 is a schematic diagram for describing another modification to the peripheral structure; and FIG. 8 is a schematic diagram for describing another modification to the peripheral structure.

DETAILED DESCRIPTION OF THE INVENTION

FIGS. 1 to 8 show a utility vehicle according to the present invention. Then, embodiments of the present invention are described below with reference to these drawings. Here, in the flowing description, it is premised that the concept of direction employed in the present embodiment agrees with the concept of direction viewed from the driver of the utility vehicle.

Figure 1:
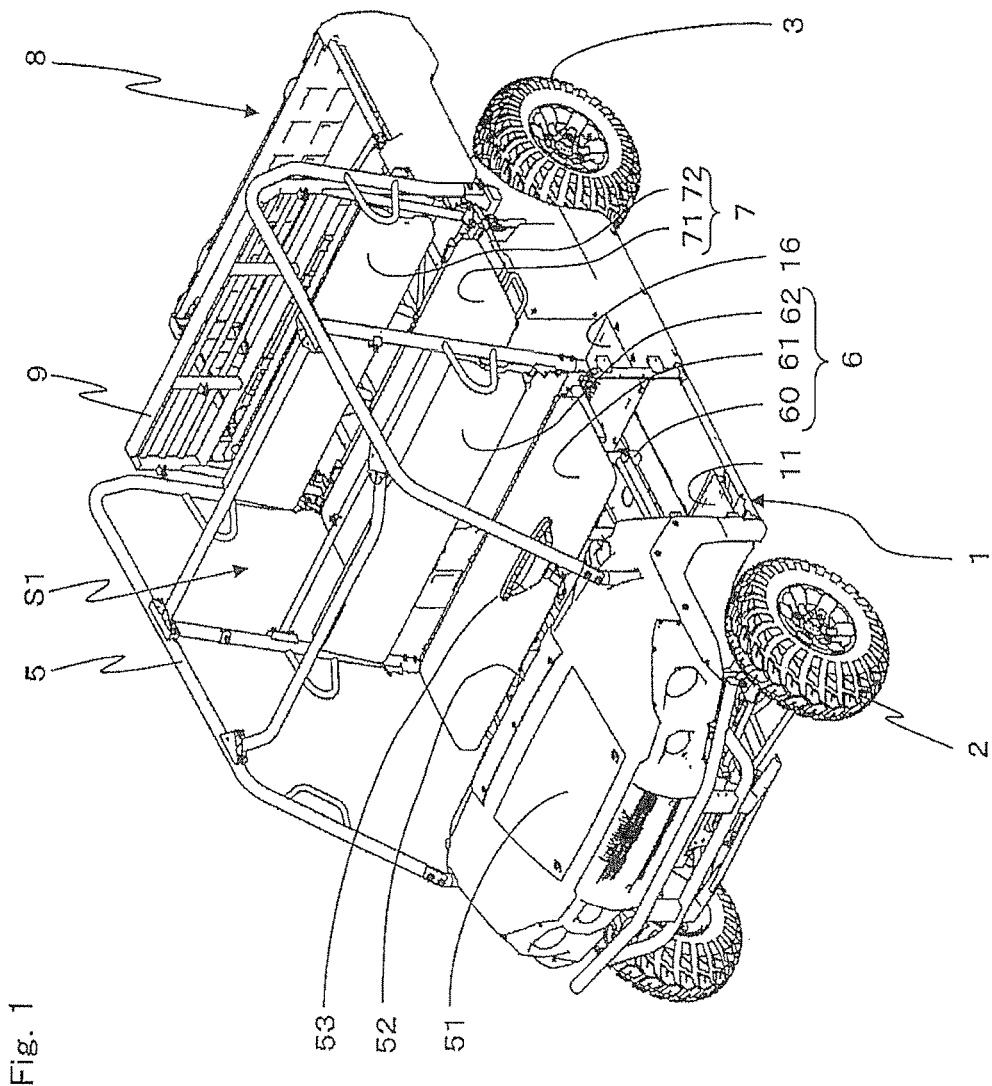
FIG. 1 is a perspective view in which a utility vehicle according to the present invention is viewed from obliquely front left.

FIG. 1 is a perspective view in which a utility vehicle according to the present invention is viewed from obliquely front left. Here, in FIG. 1, for convenience of description, illustration of doors used for getting on and off is omitted. The utility vehicle is used mainly for running in off-road circumstances like a grass field, a gravel field, and a sand field as well as an unpaved mountain path, an unpaved path through woods, a mud path, and a rocky field.

As shown in FIG. 1, a pair of right and left front wheels 2 are provided in a front part of a chassis 1 of the utility vehicle and a pair of right and left rear wheels 3 are provided in a rear part of the chassis 1. A cabin space S1 between the front wheels 2 and the rear wheels 3 is surrounded by a ROPS 5. Here, the ROPS is an abbreviation for a rollover protective structure. The cabin space S1 is provided with a front seat 6 and a rear seat 7 of bench type. The front seat 6 and the rear seat 7 are in a two-row seat configuration that the seats are arranged frontward and rearward in parallel to each other. A loading platform 8 is provided behind the rear seat 7. The loading platform 8 extends rearward from the vicinity of the rear seat 7 beyond the rear wheels 3 substantially in a horizontal direction. A screen 9 is arranged between the cabin space S1 and loading platforms 8. A bonnet 51 is provided on the front side of the cabin space S1. Then, a dashboard 52 is provided in an upper rear end part of the bonnet 51. In the dashboard 52, a steering wheel device 53 and a shift lever device (not shown) are provided within a region permitting operation by the driver siting on a sitting part 61 of the front seat 6.

The front seat 6 includes: a sitting part 61; a seatback part 62; and a seat frame 60 attached to the chassis 1 and supporting the sitting part 61 from the underside. The rear seat 7 includes a sitting part 71 and a seatback part 72. In a part located in front of the seat frame 60 and on the chassis 1, a front floor board 11 extends substantially in a horizontal direction. The front floor board 11 forms a floor on which the feet of the crew members who sit on the front seat 6 are placed. Further, in a part located between the seat frame 60 and the sitting part 71 of the rear seat 7 and on the chassis 1, a rear floor board 16 extends substantially in a horizontal direction. The rear floor board 16 forms a floor on which the feet of the crew members who sit on the rear seat 7 are placed. The rear floor board 16 is located above the front floor board 11.

Figure 2:
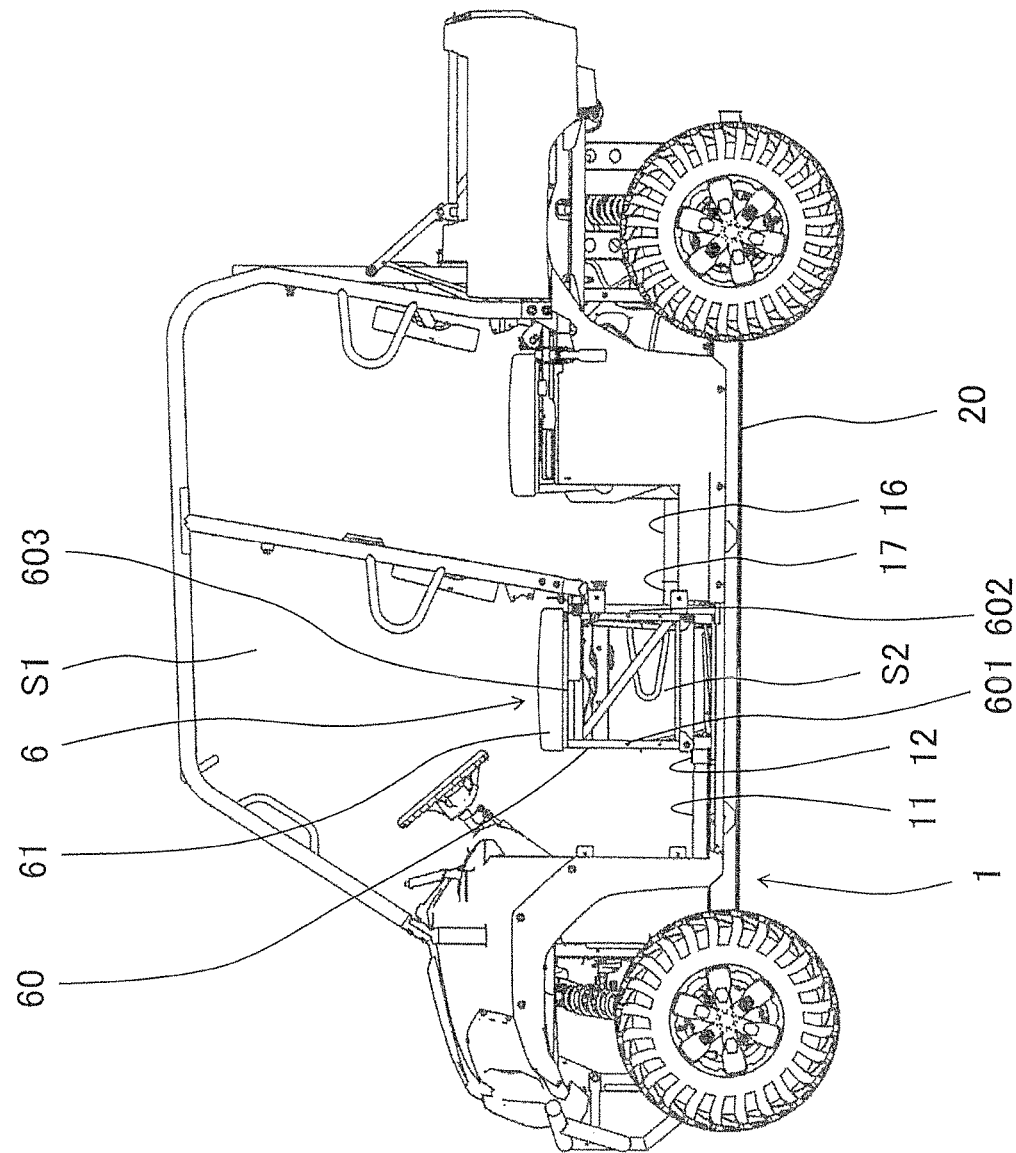
FIG. 2 is a left side view of the utility vehicle.
Figure 3:
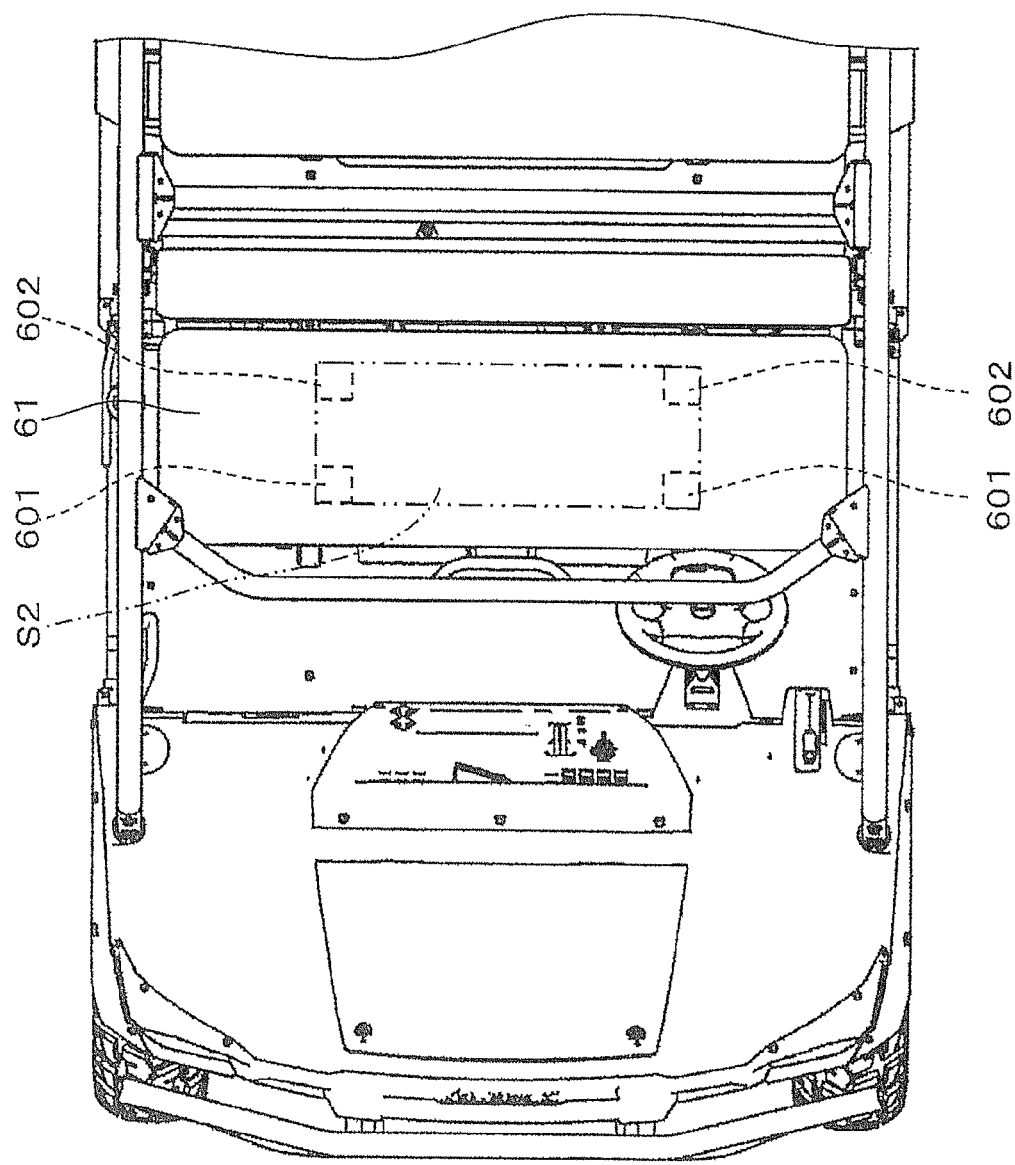
FIG. 3 is a plan view of the utility vehicle.

FIG. 2 is a left side view of the utility vehicle shown in FIG. 1. FIG. 3 is a plan view of the utility vehicle.

As shown in FIGS. 2 and 3, the seat frame 60 includes: two front legs 601; two rear legs 602; and a horizontal part 603 linking the upper ends of the front legs 601 and the upper ends of the rear legs 602 to each other and extending substantially horizontally in the frontward and rearward directions. The sitting part 61 of the front seat 6 is provided on the horizontal part 603.

The front legs 601 extend substantially in the vertical direction between the front end part of the sitting part 61 and the chassis 1. The rear legs 602 extend substantially in the vertical direction between the rear end part of the sitting part 61 and the chassis 1. The sitting part 61 is linked to the chassis 1 by the front legs 601 and the rear legs 602.

In a region surrounded by the front legs 601 and the rear legs 602, a first extension part 12 provided such as to extend rearward from the front floor board 11 substantially in a horizontal direction and a second extension part 17 provided such as to extend frontward from the rear floor board 16 and linked to the first extension part 12 are extending. The front floor board 11 contains the first extension part 12 and the rear floor board 16 contains the second extension part 17. The first and the second extension part 12 and 17 and the sitting part 61 of the front seat 6 form a storage space S2 for containing baggage. The storage space S2 is a space surrounded by the seat frame 60.

An under guard 20 is provided on the lower face of the chassis 1 under the cabin space S1 and the storage space S2. The under guard 20 avoids a situation that a stone, dust, water, or the like enters the cabin space S1 and the storage space S2 from the underside of the chassis 1.

Figure 4:
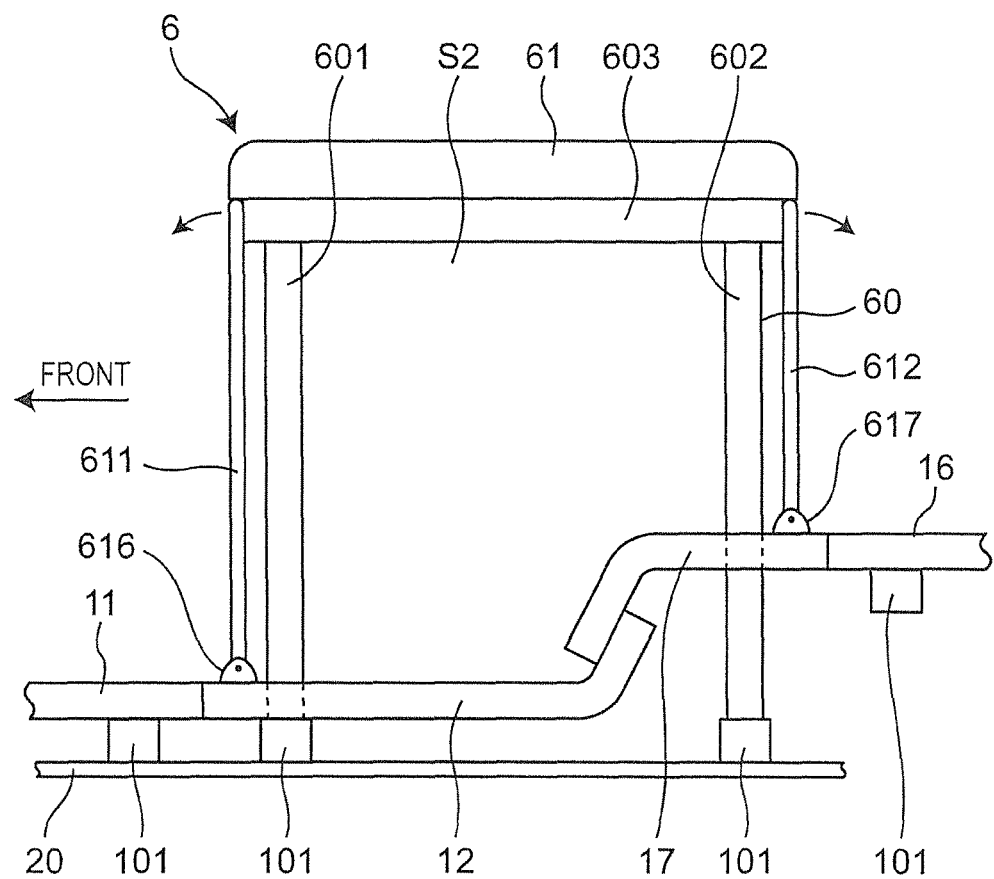
FIG. 4 is a schematic diagram for describing a peripheral structure of a storage space provided under the seat of the utility vehicle.

FIG. 4 is a schematic diagram for describing in detail the peripheral structure of the storage space S2.

As shown in FIG. 4, the first extension part 12 has substantially the same board thickness as the front floor board 11. The rear end part of the first extension part 12 is bent obliquely upper rearward. The second extension part 17 has substantially the same board thickness as the rear floor board 16. The front end part of the second extension part 17 is bent obliquely lower frontward. The upper face of the rear end part of the first extension part 12 and the lower face of the front end part of the second extension art 17 are linked and sealed to each other and thereby, similarly to the under guard 20, avoids a situation that a stone, dust, water, or the like enters the storage space S2 from the underside of the chassis 1.

The upper face of the front end part of the first extension part 12 is provided with a first hinge part 616. A front wall 611 of plate shape is attached through the first hinge part 616 to the first extension part 12. The front wall 611 extends in the up and down directions so as to cover the entirety of the front side of the storage space S2. The upper end part of the front wall 611 is in contact with the front end of the horizontal part 603 of the seat frame 60. The lower end part of the front wall 611 is attached to the first hinge part 616 in a rotatable manner. Then, the front wall 611 can rotate frontward about the lower end part.

The upper face of the rear end part of the second extension part 17 is provided with a second hinge part 617. A rear wall 612 of plate shape is attached through the second hinge part 617 to the second extension part 17. The rear wall 612 extends in the up and down directions so as to cover the entirety of the rear side of the storage space S2. The upper end part of the rear wall 612 is in contact with the rear end of the horizontal part 603 of the seat frame 60. The lower end part of the rear wall 612 is attached to the second hinge part 617 in a rotatable manner. Then, the rear wall 612 can rotate rearward about the lower end part.

The mainframe of the chassis 1 includes a plurality of cross members 101 extending substantially horizontally in the right and left directions. The lower end parts of the front legs 601 and the rear legs 602 of the seat frame 60 are individually attached to the cross members 101. The front floor board 11, the first extension part 12, the rear floor board 16, the second extension part 17, and the under guard 20 also are attached individually to the cross members 101.

Effects by Embodiment (1) The storage space S2 is formed by the first extension part 12 of the front floor board 11 and the second extension part 17 of the rear floor board 16 and by the sitting part 61 of the front seat 6. Thus, the first and the second extension part 12 and 17 can prevent a situation that dust, water, or the like enters the storage space S2 from the outside of the vehicle. Further, the storage space S2 can be formed by a simpler configuration, for example, in comparison with a case that recesses are provided separately in the driver seat and in the passenger seat. Further, without the necessity of opening and closing the sitting part 61 of the front seat 6, that is, while sitting on the front seat 6, the storage space S2 can be accessed, for example, from the frontward and rearward directions. Thus, the storage space S2 can be formed at a low cost and the storage space S2 can easily be accessed.

(2) The storage space S2 is a space surrounded by the seat frame 60 of the front seat 6 and hence the baggage or the like stored in the storage space S2 is located in the inside of the seat frame 60. This avoids a situation that the baggage or the like prevents the crew members from getting on and off or from moving.

(3) The front wall 611 can rotate frontward about the lower end part of the front wall 611 and the rear wall 612 can rotate rearward about the lower end part of the rear wall 612. Thus, the front wall 611 and the rear wall 612 can avoid a situation that the baggage or the like stored in the storage space S2 jumps out in the frontward or rearward direction. Further, when the front wall 611 and/or the rear wall 612 has been rotated, the inside of the storage space S2 can easily be accessed from frontward and/or rearward.

Other Examples (1) In the embodiment given above, the storage space S2 has been a space surrounded by the seat frame 60 of the front seat 6. However, employable configurations are not limited to this. For example, the storage space may be a space formed by: a first extension part and a second extension part extending outside the region surrounded by the front legs and the rear legs; and by the sitting part.

Figure 5:
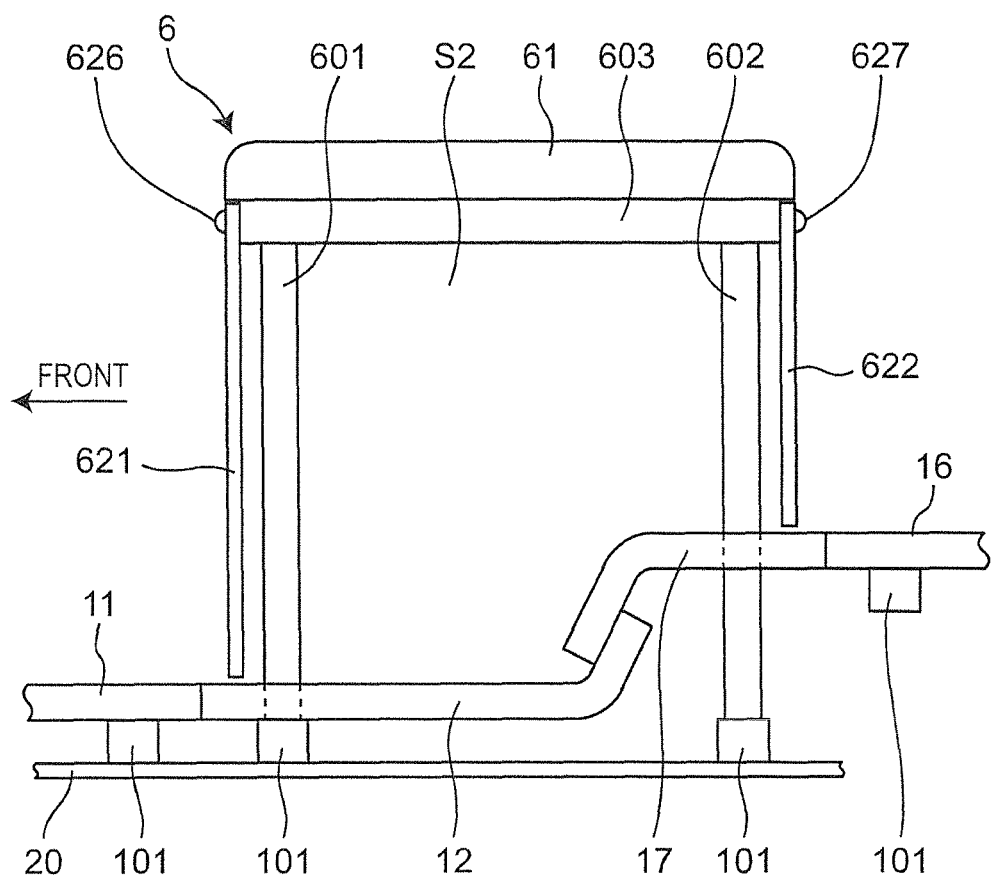
FIG. 5 is a schematic diagram for describing a modification to the peripheral structure.

(2) In the embodiment given above, the front wall 611 of plate shape has been attached through the first hinge part 616 to the first extension part 12 in a rotatable manner and, at the same time, the rear wall 612 of plate shape has been attached through the second hinge part 617 to the second extension part 17 in a rotatable manner. However, employable configurations are not limited to this. For example, as shown in FIG. 5, a front wall 621 constructed from a net member having a reticular structure may be attached with a fastener 626 to the front end surface of the horizontal part 603 of the seat frame 60. Further, a rear wall 622 constructed from a net member having a reticular structure may be attached with a fastener 627 to the rear end surface of the horizontal part 603 of the seat frame 60. Here, in FIG. 5, like numerals to those in FIG. 4 indicate like configuration components to those in FIG. 4 and hence their description is omitted.

As such, the front wall 621 and the rear wall 622 constructed from net members are attached to the sitting part 61 of the front seat 6. Thus, when a part of the front wall 621 or the rear wall 622 is merely turned over, the inside of the storage space can easily be accessed.

Here, the front wall 621 has been attached to the front end surface of the horizontal part 603 and the rear wall 622 has been attached to the rear end surface of the horizontal part 603. However, employable configurations are not limited to this. For example, the front wall 621 may be attached to the front end part of the sitting part 61 of the front seat 6 and the rear wall 622 may be attached to the rear end part of the sitting part 61. Further, the front wall 621 may be attached to the front legs 601 of the seat frame 60 and the rear wall 622 may be attached to the rear legs 602.

(3) In the embodiment given above, the front wall 611 and the rear wall 612 have been provided for the storage space S2. Further, in the another embodiment (2), the front wall 621 and the rear wall 622 have been provided. However, employable configurations are not limited to this. That is, any one alone of the front wall and the rear wall may be provided. Alternatively, both of the front wall and the rear wall may be not provided.

Figure 6:
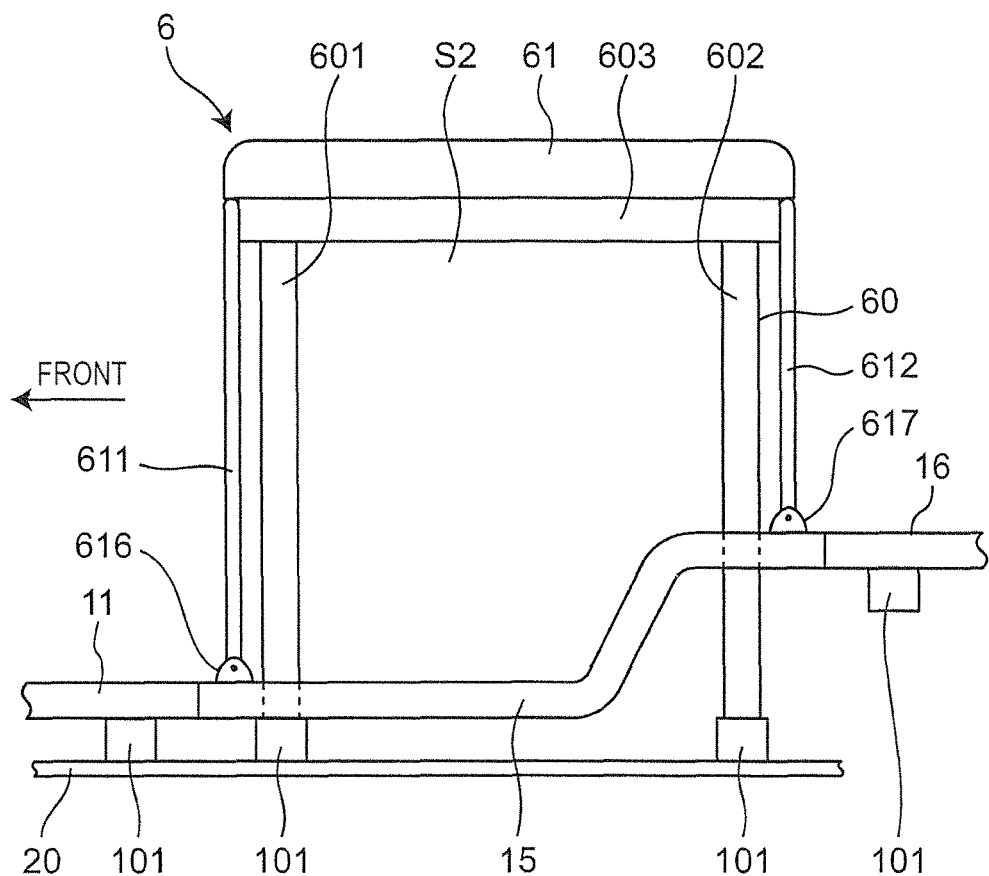
FIG. 6 is a schematic diagram for describing another modification to the peripheral structure.

(4) In the embodiment given above, the first extension part 12 provided such as to extend rearward from the front floor board 11 substantially in a horizontal direction and the second extension part 17 provided such as to extend frontward from the rear floor board 16 and linked to the first extension part 12 have extended. However, employable configurations are not limited to this. For example, the front floor board and the first extension part may be formed separate from each other. Further, the rear floor board and the second extension part may be formed separate from each other. Alternatively, as shown in FIG. 6, an extension part 15 of the front floorboard 11 may extend to the rear floor board 16. The rear end of the extension part 15 is linked to the rear floor board 16. Here, in FIG. 6, like numerals to those in FIG. 4 indicate like configuration components to those in FIG. 4 and hence their description is omitted.

(5) In the embodiment given above, the front wall 611 for covering the entirety of the front side of the storage space S2 and the rear wall 612 for covering the entirety of the rear side have been formed. However, employable configurations are not limited to this. For example, as shown in FIG. 7, an extension part 19 extending substantially horizontally in the frontward and rearward directions may be provided between the front floor board 11 and the rear floor board 161 located at the same height as the front floor board 11. The extension part 19 includes: a first protruding part 191 protruding upward in the front end part of the extension part 19; and a second protruding part 192 protruding upward in the rear end part of the extension part 19. The first protruding part 191 and second protruding part 192 are located with an interval in the frontward and rearward directions. The first protruding part 191 forms a front wall having a height smaller than or equal to half of the height of the front side of the storage space S2 and the second protruding part 192 forms a rear wall having a height smaller than or equal to half of the height of the rear side of the storage space S2. Here, in FIG. 7, like numerals to those in FIG. 4 indicate like configuration components to those in FIG. 4 and hence their description is omitted.

As such, the extension part 19 includes: the first protruding part 191 protruding upward in the front end part of the extension part 19; and the second protruding part 192 protruding upward in the rear end part of the extension part 19. Thus, the first protruding part can be formed as a front wall in an integrated manner and/or the second protruding part can be formed as a rear wall in an integrated manner. Thus, in comparison with a case that the front wall and the rear wall are formed separate from the extension part, the fabrication cost of the front wall and the rear wall can be reduced.

Here, the extension part may include any one alone of the first protruding part 191 and the second protruding part 192. Further, the extension part may include none of the first protruding part 191 and the second protruding part 192.

(6) In the embodiment given above, the front wall and the rear wall have been formed for the storage space S2. However, employable configurations are not limited to this. For example, as shown in FIG. 8, a configuration may be employed that the front wall and the rear wall of the storage space S2 are not formed, then a storage container 65 for containing baggage is placed in the storage space S2, and then the storage container 65 is provided with an opening part 65*a* opened upward and is provided in a manner of being movable in the frontward and rearward directions. More specifically, an extension part 111 extending substantially horizontally in the frontward and rearward directions is provided between the front floor board 11 and the rear floor board 161 located at the same height as the front floor board 11. Further, a groove 165 for guiding the bottom part 65*b* of the storage container 65 extending in the frontward and rearward directions is provided on the upper faces of the front floor board 11, the extension part 111, and the rear floor board 161. Here, the depth of the groove 165 is smaller than half of the height of the storage container 65. Then, the storage container 65 is guided by the groove 165 so that the storage container 65 can be moved in the frontward and rearward directions without the necessity of lifting the storage container 65. Here, in FIG. 8, like numerals to those in FIG. 4 indicate like configuration components to those in FIG. 4 and hence their description is omitted.

As such, the storage container 65 is placed in the storage space S2. Then, the storage container 65 is provided with the opening part 65*a* opened upward and is provided in a manner of being movable in the frontward and rearward directions. Thus, when the storage container 65 is moved in the frontward and rearward directions so as to be extracted from the storage space S2, the opening part 65*a* can be exposed. Thus, the inside of the storage container 65 can easily be accessed through the opening part 65*a*.

(7) In the embodiment given above, the lower end parts of the front legs 601 and the rear legs 602 of the seat frame 60 have individually been attached to the cross members 101. However, employable configurations are not limited to this. For example, the lower end parts may be attached to the first and the second extension part.

(8) In the embodiment given above, the storage space S2 has been formed by the first extension part 12 and the second extension part 17 and by the sitting part 61 of the front seat 6. However, employable configurations are not limited to this. The storage space may be formed by the sitting part of the front seat and the first extension part. Further, the storage space may be formed by the sitting part of the rear seat and the extension part extending substantially horizontally rearward from the rear floor board.

(9) In the embodiment given above, the front seat 6 and the rear seat 7 had a two-row seat configuration. Instead, a one-row seat configuration or a three-or-more row seat configuration may be employed.

(10) The present invention is not limited to the structure of the embodiments given above. That is, various kinds of modifications are included as long as they do not depart from the scope described in the claims.

What is claimed is:

1. A utility vehicle wherein a storage space for containing baggage is formed by an extension part of a floor board and a generally horizontal sitting part of a seat,
    wherein the extension part of the floor board includes a first protruding part and/or a second protruding part protruding upward with an interval in frontward and rearward directions,
    and the first protruding part forms a wall having a height smaller than or equal to half of the height of the front side of the storage space and the second protruding part forms a wall having a height smaller than or equal to half of the height of the rear side of the storage space.

2. The utility vehicle according to claim 1, wherein the storage space is a space surrounded by a seat frame of the seat.

3. The utility vehicle according to claim 1, wherein:
    a front wall and/or a rear wall is provided in the storage space;
    when the front wall is provided, the front wall is attached to the extension part of the floor board in a manner of being rotatable frontward about a lower end part of the front wall; and
    when the rear wall is provided, the rear wall is attached to the extension part of the floor board in a manner of being rotatable rearward about a lower end part of the rear wall.

4. The utility vehicle according to claim 1, wherein:
    a front wall and/or a rear wall is provided in the storage space;
    the front wall and/or the rear wall is constructed from a net member; and
    the net member is attached to the sitting part or the seat frame of the seat.

5. The utility vehicle according to claim 1, wherein:
    a storage container for containing baggage is placed in the storage space; and
    the storage container is provided with an opening part opened upward and is provided in a manner of being movable in the frontward and rearward directions.

* * * * *